(12) United States Patent
Capper

(10) Patent No.: US 8,544,788 B1
(45) Date of Patent: Oct. 1, 2013

(54) AEROSTAT ASSEMBLY

(71) Applicant: Harry M. Capper, Harrisburg, PA (US)

(72) Inventor: Harry M. Capper, Harrisburg, PA (US)

(73) Assignee: Captures, LLC, Harrisburg, PA (US)

( * ) Notice: Subject to any disclaimer, the term of this patent is extended or adjusted under 35 U.S.C. 154(b) by 0 days.

(21) Appl. No.: 13/735,562

(22) Filed: Jan. 7, 2013

Related U.S. Application Data

(63) Continuation-in-part of application No. PCT/US2010/041197, filed on Jul. 7, 2010.

(51) Int. Cl.
*B64B 1/50* (2006.01)

(52) U.S. Cl.
USPC ............ 244/33; 244/30; 244/31; 396/12

(58) Field of Classification Search
USPC ............ 244/33, 30, 31, 127; 396/12, 13; 359/354; 348/144
See application file for complete search history.

(56) References Cited

U.S. PATENT DOCUMENTS

| | | | |
|---|---|---|---|
| 1,002,897 A | 9/1911 | Brown | |
| 2,685,238 A | 8/1954 | Baker | |
| 3,638,502 A | 2/1972 | Leavitt et al. | |
| 4,204,656 A * | 5/1980 | Seward, III | 244/30 |
| 4,891,029 A * | 1/1990 | Hutchinson | 446/58 |
| 4,989,466 A | 2/1991 | Goodman | |
| 5,034,759 A * | 7/1991 | Watson | 396/7 |
| 5,752,088 A * | 5/1998 | Desselle | 396/12 |
| 5,757,157 A * | 5/1998 | Falk et al. | 318/560 |
| 5,857,645 A * | 1/1999 | Hodgson | 244/33 |
| 6,010,093 A | 1/2000 | Paulson | |
| 6,154,317 A | 11/2000 | Segerstrom et al. | |
| 7,036,768 B2 | 5/2006 | Bundo | |
| 7,068,927 B2 | 6/2006 | Itzkowitz | |
| 7,510,142 B2 * | 3/2009 | Johnson | 244/17.17 |
| 8,251,597 B2 * | 8/2012 | Dougherty et al. | 396/428 |
| 2002/0014555 A1 | 2/2002 | Smith | |
| 2009/0103909 A1 * | 4/2009 | Giegerich et al. | 396/12 |
| 2011/0222047 A1 * | 9/2011 | Guetta et al. | 356/4.01 |
| 2012/0155817 A1 * | 6/2012 | Cottrell et al. | 385/116 |

FOREIGN PATENT DOCUMENTS

| | | |
|---|---|---|
| EP | 0771729 | 5/1997 |
| FR | 2504490 | 10/1982 |
| FR | 2761337 | 10/1998 |
| JP | 2006001435 | 1/2006 |
| JP | 2009023379 | 2/2009 |
| RU | 2261749 | 10/2005 |

OTHER PUBLICATIONS

Korean Patent Office, International Search Report dated Feb. 1, 2011 in corresponding PCT/US2010/041197, 8 pages.

\* cited by examiner

*Primary Examiner* — Christopher P Ellis
(74) *Attorney, Agent, or Firm* — Hooker & Habib, P.C.

(57) ABSTRACT

An aerostat assembly, specifically an aerostat assembly including one or more cameras for aerial photography and surveillance. The aerostat assembly includes a frame assembly having a pivot assembly joined to a balloon tether line. Thrusters on the frame allow an operator to maneuver the assembly to desired positions as well as rotate the frame assembly about the pivot assembly.

19 Claims, 15 Drawing Sheets

AEROSTAT ASSEMBLY

This application is a continuation-in-part of my co-pending PCT application for Aerostat Assembly, Application No. PCT/US2010/041197 filed Jul. 7, 2010.

FIELD OF THE DISCLOSURE

The disclosure relates to aerostat assemblies, in particular, aerostat assemblies having one or more cameras for aerial photography and surveillance.

BACKGROUND OF THE DISCLOSURE

It is known to use aerostat aircraft or model helicopter-type aircraft having a mounted camera to capture aerial photographic and video images. Aerostats are aircraft that remain aloft primarily by lift provided by a buoyant balloon and/or by aerodynamic lift provided by the contoured shape of the balloon. Conventional aerostats are moored to the ground by a tether line to prevent escape from the operator. Helicopter-type aircraft, normally either helicopters or multicopters, remain aloft through lift provided by one or more engine driven rotors.

Using conventional aerostats for aerial photography and surveillance is difficult. Aerostats allow little operator control. Positioning the camera to maintain a picture frame is difficult as aerostat position is affected by wind. The ability to maneuver and rotate an aerostat is limited. Shifting winds require repositioning of the aerostat and tether line to maintain a picture frame. Much operator effort is required to keep the tether line and other aerostat components from blocking or falling into the picture frame.

Additionally, balloons used with conventional aerostats must be very large to provide sufficient lift to raise the aerostat to a desired elevation. Trucks or like large vehicles are needed to transport the balloon and tanks containing appropriate amounts of the expensive lighter-than-air gasses required to fill the balloon.

While helicopter-type aircraft offer an improved degree of positional control over conventional aerostats, constant use of rotors transmits vibrations to attached cameras, resulting in impaired image quality. Constant rotor operation to maintain lift consumes large amounts of energy and limits fight times, limiting the amount of time a camera can maintain a desired aerial picture frame. If rotors or other mechanical components fail, helicopter control becomes impossible. The helicopter-type aircraft will crash to the ground, damaging the aircraft and attached camera equipment and risking injury to by-standers.

Thus, there is a need for an improved aerostat assembly for aerial photography and aerial surveillance. The aerostat assembly should allow the operator to maintain precise control over camera position regardless of wind shifts or aircraft position, should be easy to transport with reduced use of expensive lighter-than-air gasses, should transmit minimal vibrations to camera equipment, allow prolonged flight times with low energy requirements and reduce injury risk to equipment and by-standers in case of control or power failure.

SUMMARY OF THE DISCLOSURE

Disclosed is an improved aerostat assembly for aerial photography and aerial surveillance. The assembly allows an operator to have precise control over aerostat camera position regardless of wind shifts, is easy to transport, uses smaller quantities of expensive lighter-than-air gasses than conventional aerostats, transmits minimal vibrations to camera equipment, allows greatly prolonged flight times over helicopter-type aircraft with low energy requirements and reduces injury risk to equipment and by-standers in case of control or power failure.

The aerostat assembly includes a frame assembly joined to a buoyant aerostat balloon by a tether line. The frame assembly includes a pivot assembly joined to the tether line and is balanced in mechanical equilibrium about the pivot assembly.

One or more cameras are mounted to the frame assembly to capture images. Fan thrusters mounted to the frame assembly allow an operator to maneuver the aerostat assembly to a desired position, position the frame assembly about the pivot assembly independently of the assembly's position and rotate the aerostat assembly about its yaw, pitch or roll axes as desired. The ability to freely position the aerostat assembly allows an operator to maintain a desired picture frame in shifting wind conditions.

The assembly also allows an operator to apply additional lift force to the assembly using the thrusters. This permits use of smaller balloons containing smaller quantities of expensive lighter-than-air gasses than conventional aerostats. These balloons can be transported using smaller vehicles rather than a truck or other larger vehicle. Smaller balloons are easier to transport to a launch site and require less time and effort to prepare for launch.

The use of a balloon in the assembly as a lift source removes the need to use large lift rotors found in model helicopter-type aircraft. This reduces vibrations that disturb camera use and allows for greatly prolonged flight times over helicopter-type aircraft with low energy requirements. Additionally, in case of partial or total thruster failure, the balloon prevents the assembly from crashing to the ground, greatly reducing the risk of equipment damage or by-standard injury.

The aerostat assembly may be tethered to the ground or used in an untethered embodiment that allows the operator freedom in maneuvering the assembly.

The assembly may be adapted to indoor use in arenas, stadiums and other large structures.

The assembly may include multiple mounted cameras each facing in different directions to give the assembly an increased viewing field. Ideally, the multiple cameras will give the assembly a viewing field of 360 degrees surrounding the assembly to provide an operator with an improved aerial surveillance vantage point.

Other objects and features will become apparent as the description proceeds, especially when taken in conjunction with the accompanying drawing sheets illustrating embodiments of the aerostat assembly.

DETAILED DESCRIPTION

Figure 1:
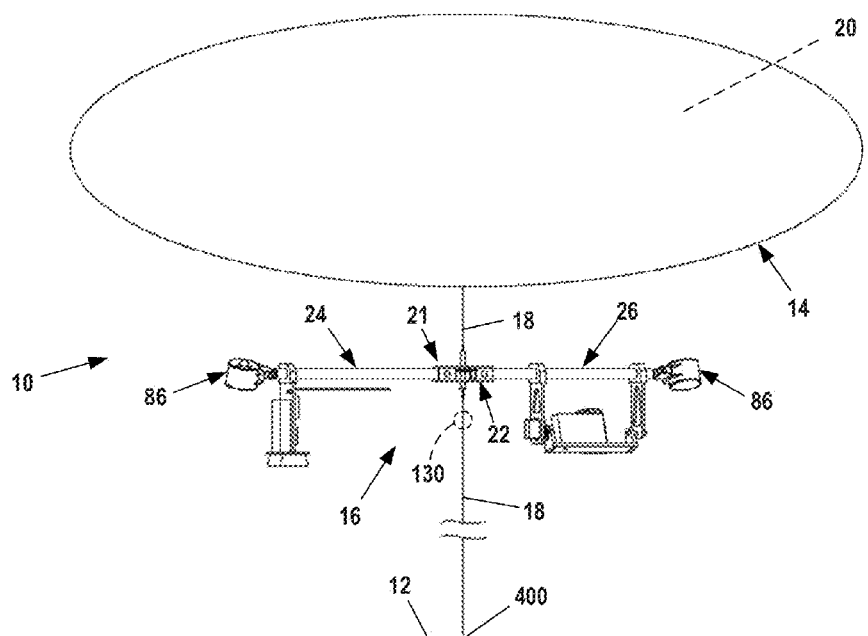
FIG. 1 is a perspective view of a first embodiment tethered aerostat assembly.

FIG. 1 is a perspective view of a first embodiment aerostat assembly 10 tethered to ground 12.

Assembly 10 is made up of an aerostat balloon 14 jointed to a frame assembly 16 by a tether line 18. Frame assembly 16 hangs freely under balloon 14 and is supported by tether line 18.

Figure 14:
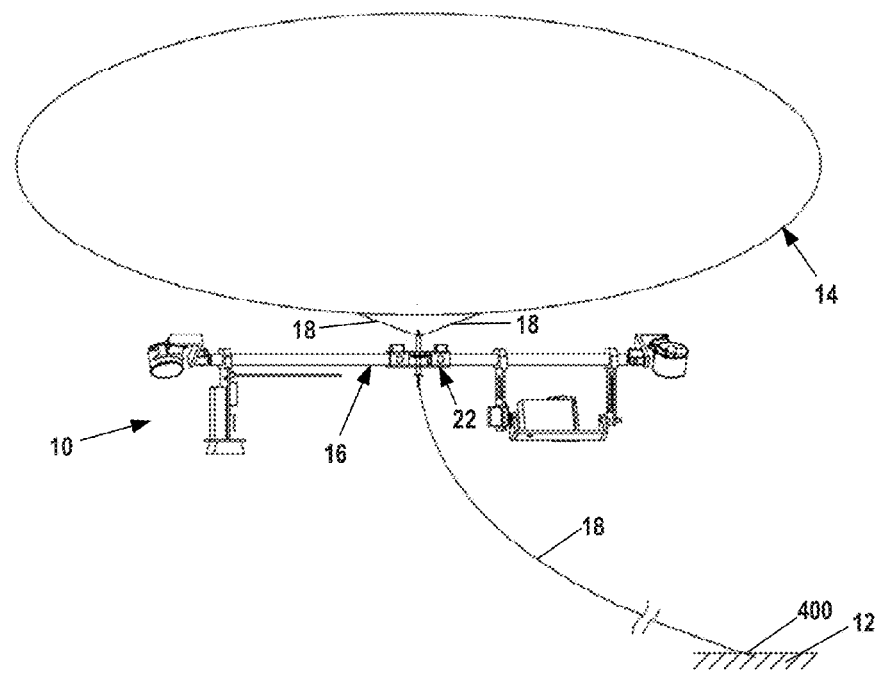

The tether line 18 joining frame assembly 16 to aerostat balloon 14 may be a length of flexible conventional cord or line used to tether aerostat assemblies or may be a short linkage made of metal or other study, inflexible material. If desired, the tether line 18 joining the frame assembly 16 to aerostat balloon 14 may include multiple lines 18 as shown in FIG. 14.

Aerostat balloon 14 may be any conventionally known balloon used for moored balloons, blimps or other free flying airships. Balloon 14 is filled with a buoyant, lighter-than-air gas 20 that provides lift to assembly 10. If desired, balloon 14 may be a kite-type aerostat that provides aerodynamic lift though an oblate body shape, fins or other appropriately shaped surfaces.

As show in FIGS. 1, 2, 3, 10, 11 and 13-16, first embodiment aerostat assembly 10 frame assembly 16 is a generally linear and elongate boom assembly 21.

Boom assembly 21 has a center support 22 and opposed booms or beams 24 and 26 extending to either side of support 22. Booms or beams 24 and 26 may be hollow structures formed from carbon-fiber or a like, sturdy lightweight material.

Figure 4:
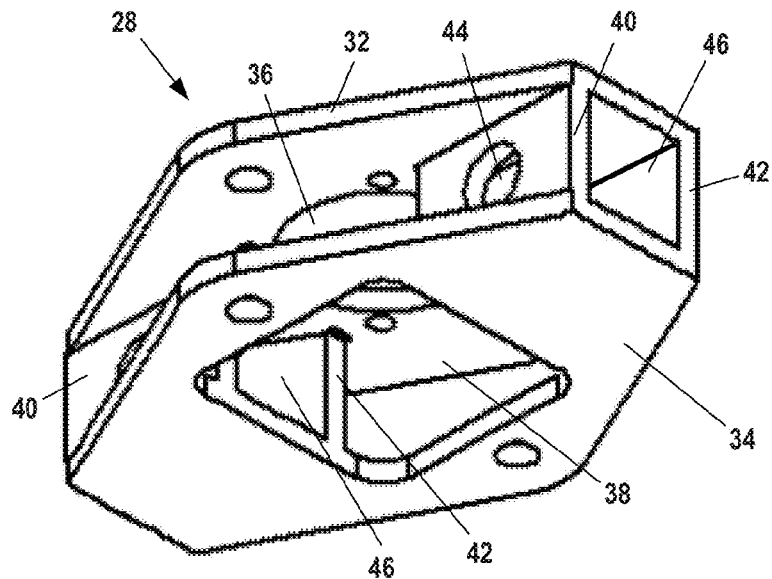
FIG. 4 is perspective view of a support mounting.
Figure 5:
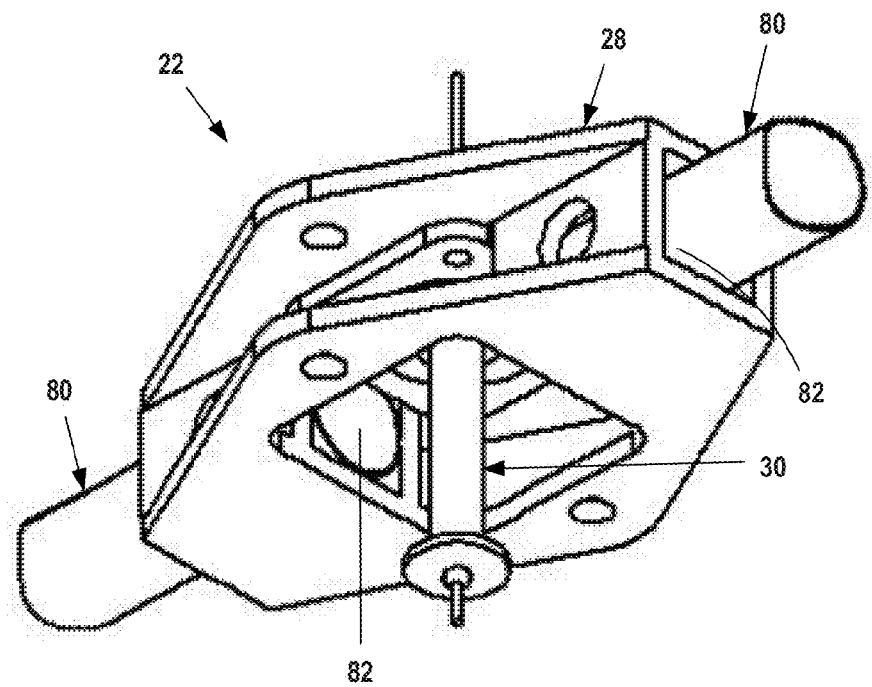
FIG. 5 is a perspective view of a support mounting and pivot assembly.

Center support 22 is made up of support mounting 28 and pivot assembly 30. See FIGS. 4 through 6.

Support mounting 28 has top and bottom plates 32 and 34. Top plate 32 has an aperture 36 and bottom plate 34 has an aperture 38. Bracket plates 32 and 34 are joined together by support walls 40 and 42 located at either end of mounting 28. Each support wall 40 may include a hole 44 to reduce frame weight. The plates and walls define mounting apertures 46 located at either end of support mounting 28.

Pivot assembly 30 is attached to support mounting 28. Pivot assembly 30 may be a gimbal assembly 48. Gimbal assembly 48 includes a mounting plate 50, a rolling element assembly 52 and a pivot ball 54.

Mounting plate 50 includes a number of mounting holes 56 and a mounting plate aperture 58.

Rolling element assembly 52 is located within mounting plate aperture 58 and includes an assembly ring 60 rotatably joined to plate 50. Ball bearings 62 seated in plate groove 64 and ring groove 66 allow free rotation of assembly ring 60 relative to mounting plate 50.

Assembly ring 58 has a ring aperture 68.

Pivot ball 54 is seated within ring aperture 68 and includes a ball aperture 70. Pivot ball 54 rotates and pivots freely relative to assembly ring 60.

Tether line mounting tube 72 is connected to ball 54, extends through ball aperture 70 and includes an engagement end or washer 74 at the lower end of the tube. Washer 74 includes a central aperture 76.

Pivot assembly 30 is joined to support mounting 28 to form center support 22. Pivot assembly 30 is secured to support mounting 28 by extending fasteners through mounting holes 56 and into like mounting holes in top plate 32 to secure mounting plate 50 to frame top plate 32.

Figures 8, 9:
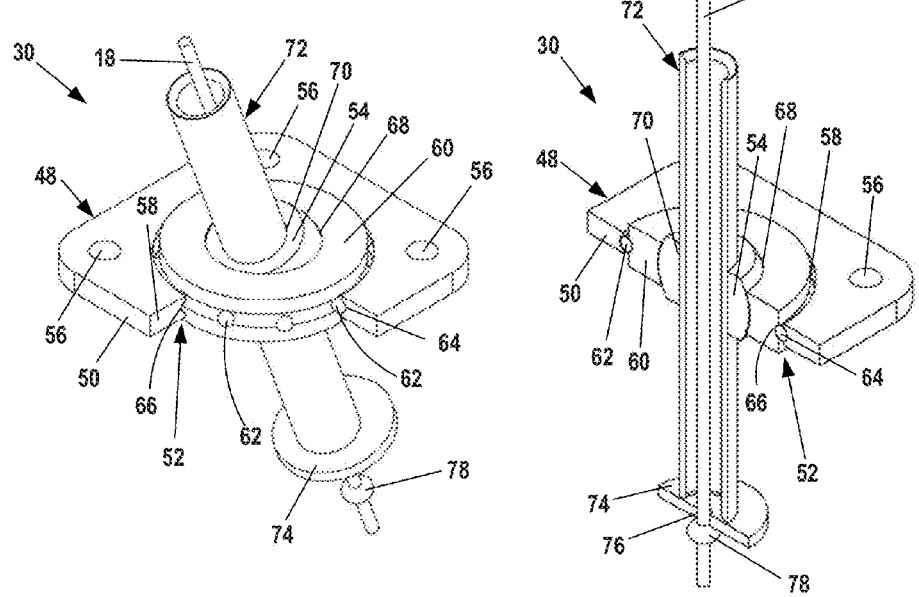
FIG. 8 is a partial sectional view of the pivot assembly of FIG. 7.
FIG. 9 is a sectional view of the pivot assembly of FIG. 6.

Tether line 18 includes a stop or knot 78 that engages mounting tube washer 74 at aperture 76 to secure center support 22 and frame assembly 16 to tether line 18. See FIG. 9.

Gimbal assembly 48 may be a pivot ball alone, or any pivot assembly known in the art that allows free rotation and pivoting of frame assembly 16 about tether line 18. Gimbal assembly 48 may include a rotational swivel coupling.

Gimbal assembly 48 may be a swash plate assembly from a model helicopter. The swash plate assembly may be Thunder Tiger Raptor brand swash plate assembly, part number PV0010.

Pivot assembly 30 allows frame assembly 16 to rotate freely about center support 22 and allows the operator to rotate the assembly about its yaw, pitch or roll axes as explained in detail below.

If desired, pivot assembly 30 may include a gimbal lock. When activated, the gimbal lock prevents the assembly from rotating about a yaw or roll rotational axis as selected by the operator. If desired, the gimbal lock may prevent assembly rotation about more than one rotational axis. This allows the operator improved control of the assembly in certain wind conditions.

Figures 6, 7:
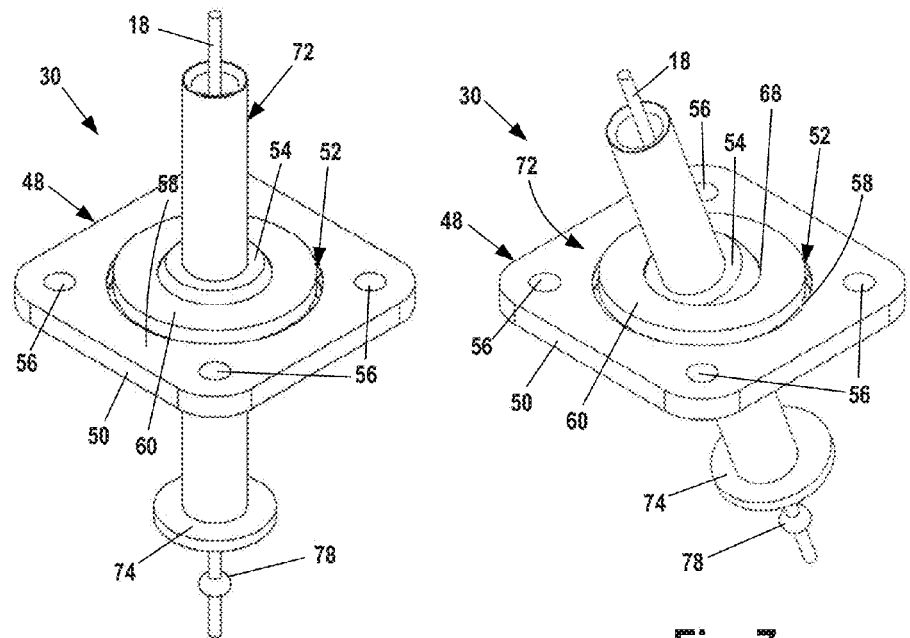
FIGS. 6 and 7 are perspective views of a pivot assembly.

The frame assembly rests in mechanical equilibrium. In the absence of thrust or wind forces acting on the frame assembly, the frame assembly remains in a horizontal position regardless of the angle of tether line 18, tether line mounting tube 72 and pivot ball 54 within the angular tolerance of the assembly. The angular tolerance of pivot assembly 30 shown in shown in FIGS. 6 and 7 is about 45 degrees, but may vary depending on the pivot assembly in center support 22.

Booms or beams 24 and 26 each have an elongate arm 80 extending from an arm inner end 82 to an arm outer end 84.

Each arm 80 is jointed to center support 22 by placing an arm inner end 82 into a mounting aperture 46. Adhesive is used to secure each arm inner end in a mounting aperture 46.

A fan thruster assembly 86 is jointed to arm outer end 84. Thruster assembly 86 includes thruster assembly base 88 joined to a rotational assembly 90 and a fan thruster 92 joined to the rotational assembly.

Rotational assembly 90 allows an operator to rotate fan thruster 92 relative to the boom arm. Rotational assembly 90 may include a servomotor 94.

Fan thruster 92 includes a motor attached to a number of fan blades 96 in a guard collar 97 surrounding the fan blades. Fan thruster 92 is activated so that the motor turns the fan blades at a desired speed to provide a desired amount thrust to maintain or change the position of the aerostat assembly. Rotational assembly 90 is activated to allow the operator to control thrust direction by rotating fan thruster 92 relative to the boom arm.

Thruster 92 may include an electrically powered motor such as a brushless electronic ducted fan motor, a liquid fuel powered motor or another motor known in the art to rotate the thruster fan blades.

Figure 2:
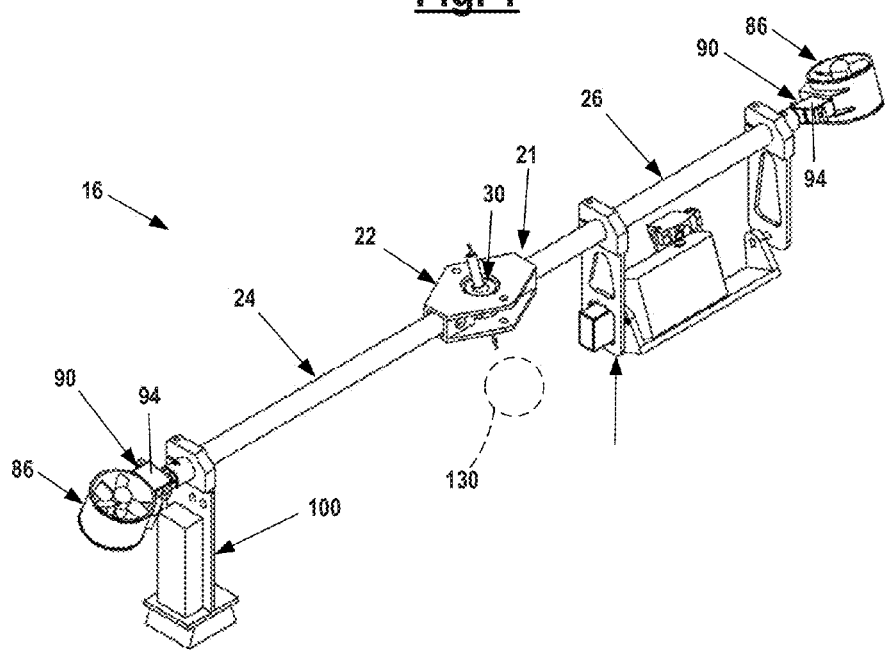
FIG. 2 is a perspective view of the first embodiment aerostat assembly.
Figure 3:
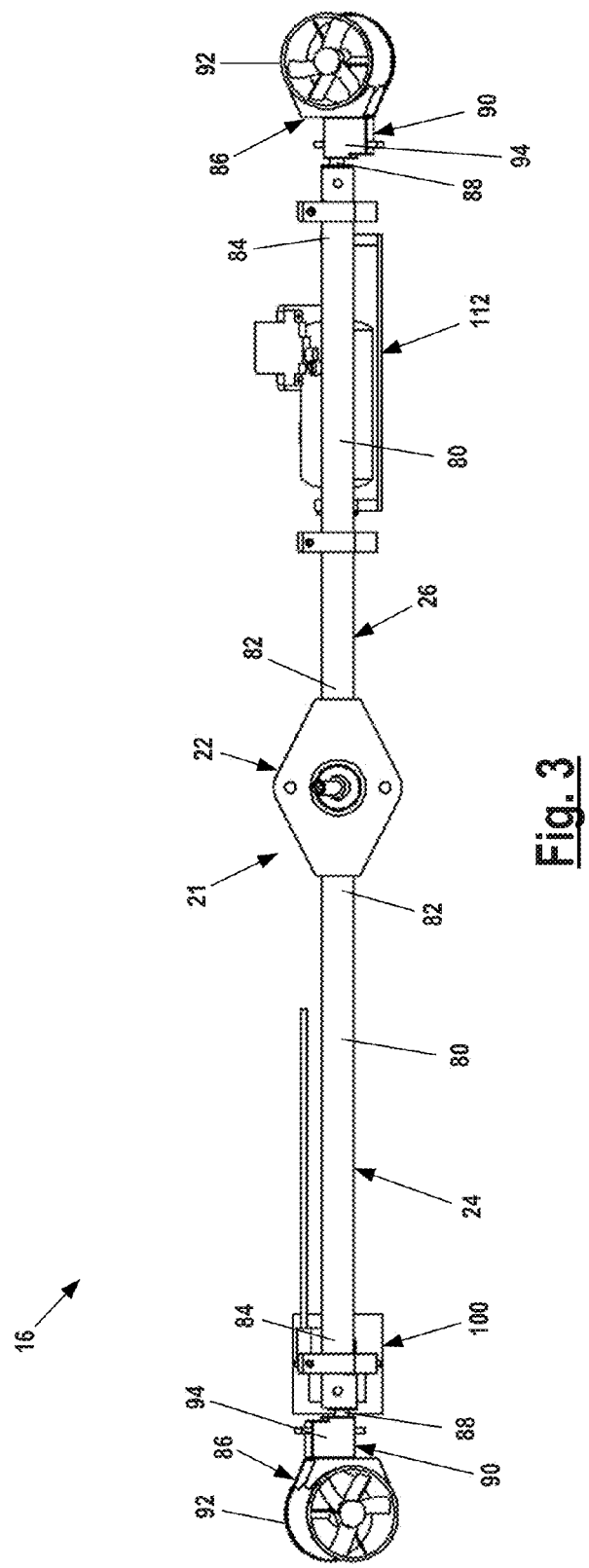
FIG. 3 is a top view of the first embodiment aerostat assembly.

Rotational assembly 90 may include a single servomotor 94 as shown in FIGS. 2 and 3.

Figure 12:
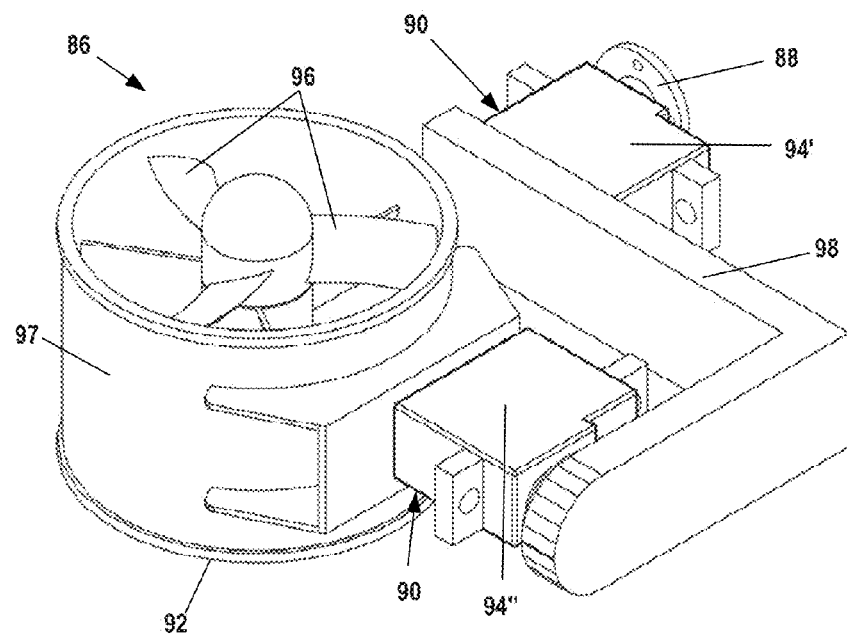
FIG. 12 is a perspective view of a thruster assembly.

In alternate embodiments, rotational assembly 90 may include more than one servomotor 94. See FIGS. 10, 11 and 12. Rotational assembly 90 includes a first servomotor 94' joined to base 88 and one end of an L-shaped bracket 98 and a second servomotor 94" joined to the other end of bracket 98 and thruster 92.

A multiple servomotor rotational assembly allows an operator greater control over thrust direction than a single rotational assembly.

Boom or beam 24 includes a support 100 having a single T-shaped support arm 102. Support 100 includes a control module 104 mounted to arm 102. Module 104 receives thrust and positioning signals from a remote control device and relays the signals to thruster assemblies 86 through wires mounted to boom 24 or by wireless means. Module 104 includes an antenna 106 for receiving radio signals from the control device actuated by the on-ground operator of the assembly 10. Alternatively, module 104 may receive thrust and positioning signals transmitted from the operator along hard-wired electrical wiring, fiber optic cable or the like that is suspended along the tether line. The hard-wiring allows data transfer for control of the aerostat assembly and return data from cameras without the use of radio signals. This is useful in security-sensitive applications.

Support 100 also includes energy source 108. Source 108 stores electrical power or fuel for the thruster assemblies. Electrical power or fuel is distributed to the thrusters by wires or fuel lines leading from source 108 to each thruster assembly (not shown). If desired, tethered embodiments of the aerostat assembly may include a power or fuel line that extends from the ground and along the tether line to the frame assembly to provide power or fuel to the thruster assemblies.

If desired, any assembly wires or fuel lines may be routed through hollow booms 24 and 26.

If desired, center support 22 may also include one or more tilt sensors 110. Tilt sensor 110 may be a gyroscopic, infrared, magnometer device or the like adapted to measure the assembly's angular position around its yaw or roll axes. Sensor 110 automatically sends thrust and positioning signals to control module 104 to maintain a given assembly position about its yaw or roll axes and allows the operator to override these signals when desired to change assembly position.

Boom or beam 26 includes a camera support 112 having a pair of support arms 114 and 116 and a support base 118 pivotally attached to arms 114 and 116 at pivot joints 120 and 122. A camera 124 is mounted on support base 118. A rotational servo assembly 126 located at pivot joint 120 allows an operator to adjust the position of support base 118 relative to support arms 114 and 116. This allows an operator to adjust camera tilt position. Rotational servo assembly 126 may include a servomotor.

If desired, camera support 112 may include a pitch sensor 128. Pitch sensor 128 may be a gyroscopic, infra-red, magnometer device or the like adapted to measure the assembly's motion about its pitch axis. Sensor 128 automatically sends signals to actuate rotational servo assembly 126 to compensate for undesired motion about the pitch axis to maintain a desired camera tilt position and picture frame.

Figure 10:
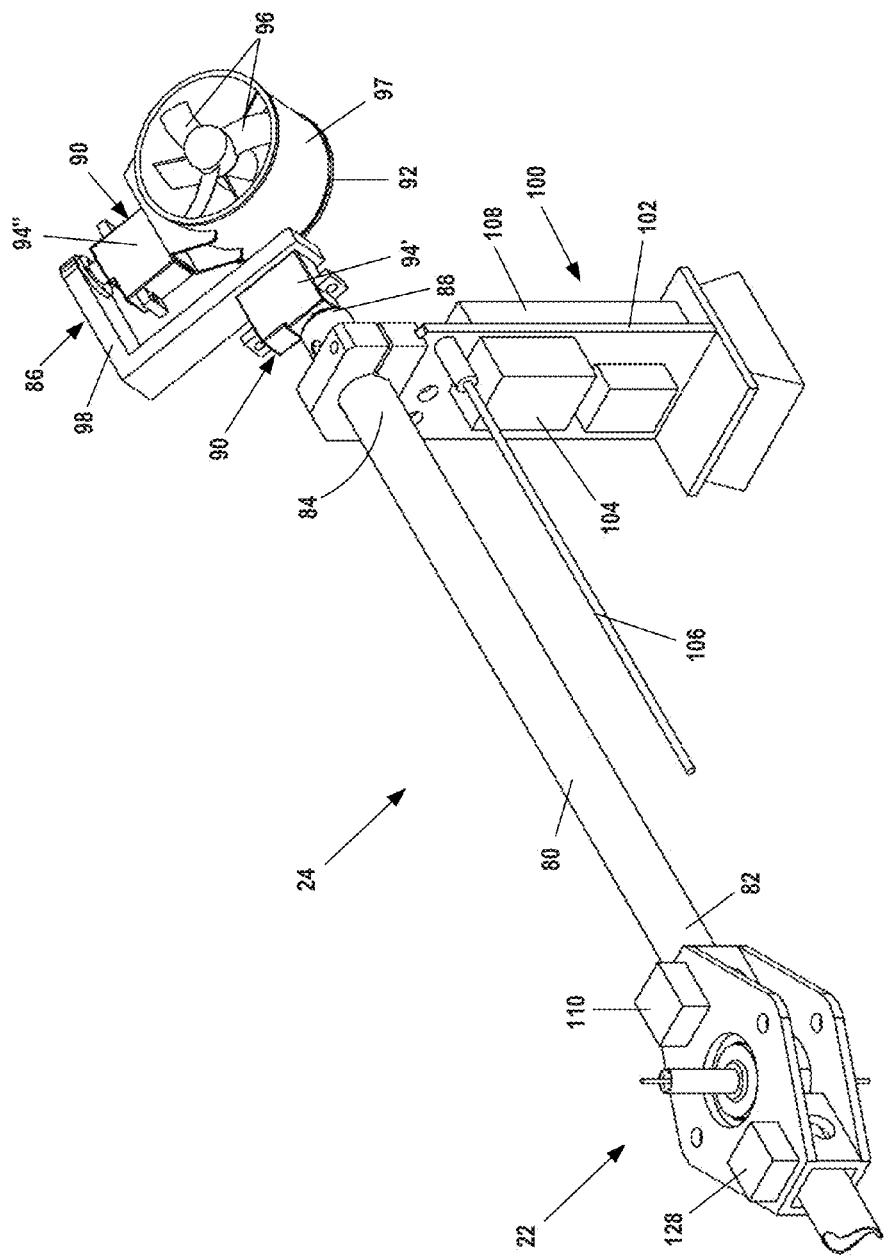
FIGS. 10 and 11 are perspective views of frame portions.
Figure 11:
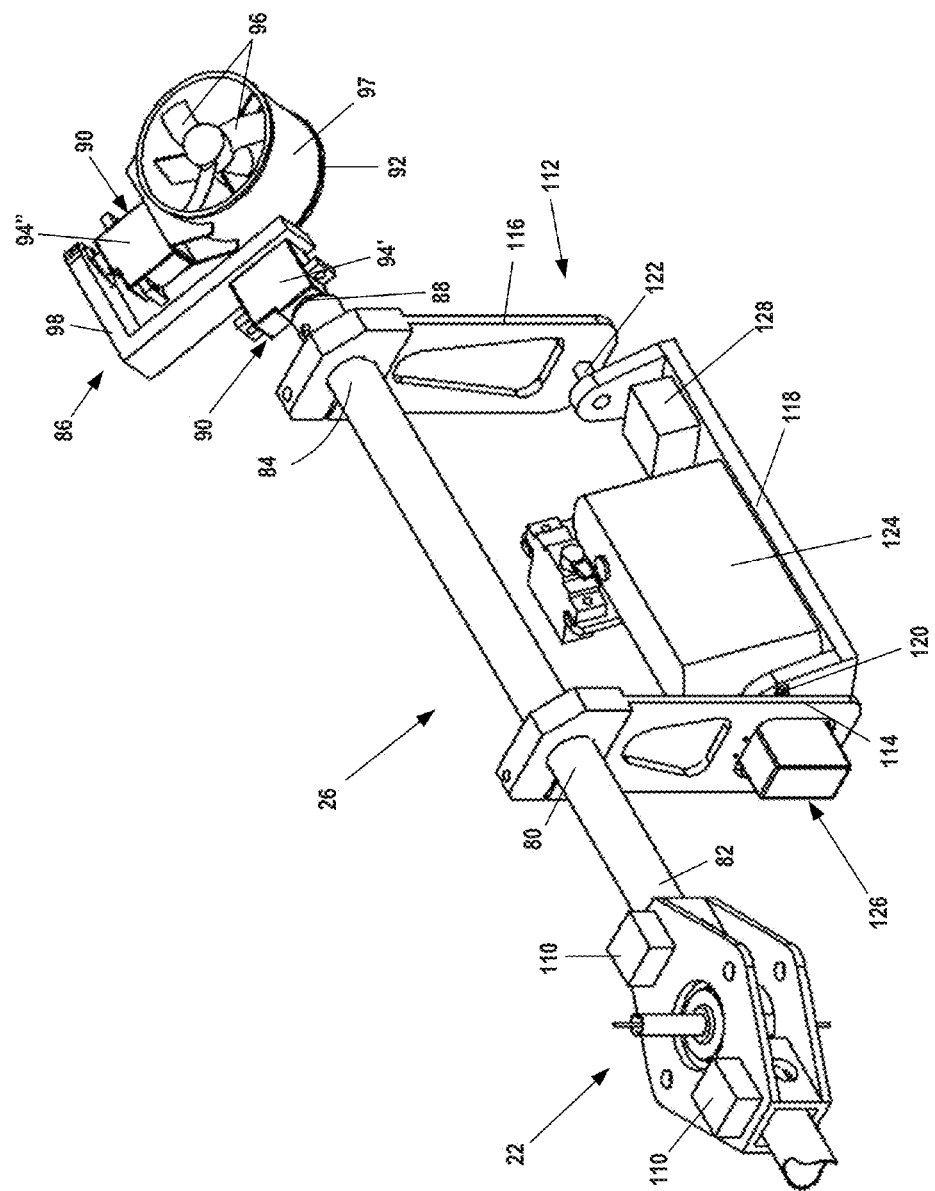

If desired, pitch sensor 128 may be mounted on support mounting 28 proximate tilt sensor 110 as shown in FIG. 10. It is further understood that multiple sensors used in the assembly may be housed in a single module or enclosure, and that preferred sensors for the assembly may be those originally developed for stabilizing remotely controlled model aircraft.

Rotational servo assembly 126 is activated by module 104 to adjust the position of support base 118 relative to arms 114 and 116. This allows an operator additional control of a camera picture frame.

Camera 124 may be a conventional analog or digital camera. Camera 124 is actuated by module 104 to activate the camera's shutter trigger and control other camera functions such as zoom, aperture and so forth. Digital camera 124 may include a memory storage device for storing large digital files of high-quality still or video images. Camera 124 may be capable of capturing infrared or ultraviolet radiation.

Camera 124 may be a digital camera capable of transmitting video and audio information received by the camera and relayed through a video transmitter mounted on the assembly to an operator. The video and audio information assists the operator in controlling the aerostat assembly. Camera 124 may contain an integrated power supply or may obtain power from energy source 108 or from cabling extending from the ground and along the tether line to the camera. The video transmitter may be integrated into module 104 or be separately mounted onto the assembly.

As stated above, pivot assembly 30 allows free rotation and pivoting of frame assembly 16 about tether line 18. Frame assembly 16 is constructed so that the weight of booms 24 and 26 are balanced about center support and pivot assembly 30 so that frame assembly is in mechanical equilibrium and boom assembly remains generally parallel to the ground. Thrust forces or winds change the rotational position of the frame assembly about its pitch axis. The frame assembly returns to a position generally parallel to the ground when the thrust forces or winds cease.

Frame assembly 16 is constructed so that frame assembly center of gravity 130 is located under center support 22 and pivot assembly 30 as illustrated in FIGS. 1 and 2. The location of center of gravity 130 under pivot assembly 30 contributes to the stability of frame assembly 16 about pivot assembly 30 so that the frame assembly is encouraged to return to a position generally parallel to the ground when disturbing thrust forces or winds cease.

An alternate embodiment boom assembly is contemplated wherein the boom assembly 21 includes only a single thruster assembly. This embodiment allows an operator to control the rotational position of the boom assembly while reducing boom assembly weight.

Alternate embodiments of the boom assembly are contemplated wherein boom assembly 21 includes more than two boom or beam arms balanced about center support 22 so that boom assembly is in mechanical equilibrium in a generally Y, X or like shape.

FIGS. 17-22 illustrates a second embodiment aerostat assembly 200.

Assembly 200 is generally similar to above described assembly 10, made up of an aerostat balloon jointed to a frame assembly 210 by a tether line 212, like tether line 18 described above. Frame assembly 210 hangs freely under the balloon and is supported by tether line 212.

As shown in FIGS. 17-22 second embodiment aerostat assembly 200 frame assembly 210 has a center support 214 joined to polygonal frame 216 by a number of spars 218.

Center support 214 is made up of a support plate 220 and pivot assembly 222. Pivot assembly 222 is mounted to plate 220 by a number of fasteners 224. Pivot assembly 222 may be identical to pivot assembly 30 as described above and have a gimbal assembly 226 like gimbal assembly 48. Center support 214 engages tether line 212 in a manner similar or identical to tether line 18 engaging pivot assembly 30 as described above. Support plate 220 has a number of downwardly-extending spar mounting tabs 228.

Octagonal frame 216 is made up of eight equal-length beams 230. Beams 230 may be hollow and formed from carbon-fiber or a like, sturdy lightweight material. Beams 230 may be joined together by adhesive or other construction means.

Polygonal frame 216 has a number of upwardly-extending spar mounting tabs 232.

Spars 218 are joined to support plate 220 and frame 218 at tabs 228, 232 by fasteners 224.

In a preferred embodiment, support plate 220, spars 218 and frame 216 cooperate to form a substantially rigid frame assembly 210 so that as forces are exerted on the frame assembly, it acts as a unitary body. In alternate possible embodiments, frame assembly 210 may be molded from a substantially single piece of material.

In an alternate embodiment, spars 218 may be replaced by a flexible cords or cables.

Figure 17:
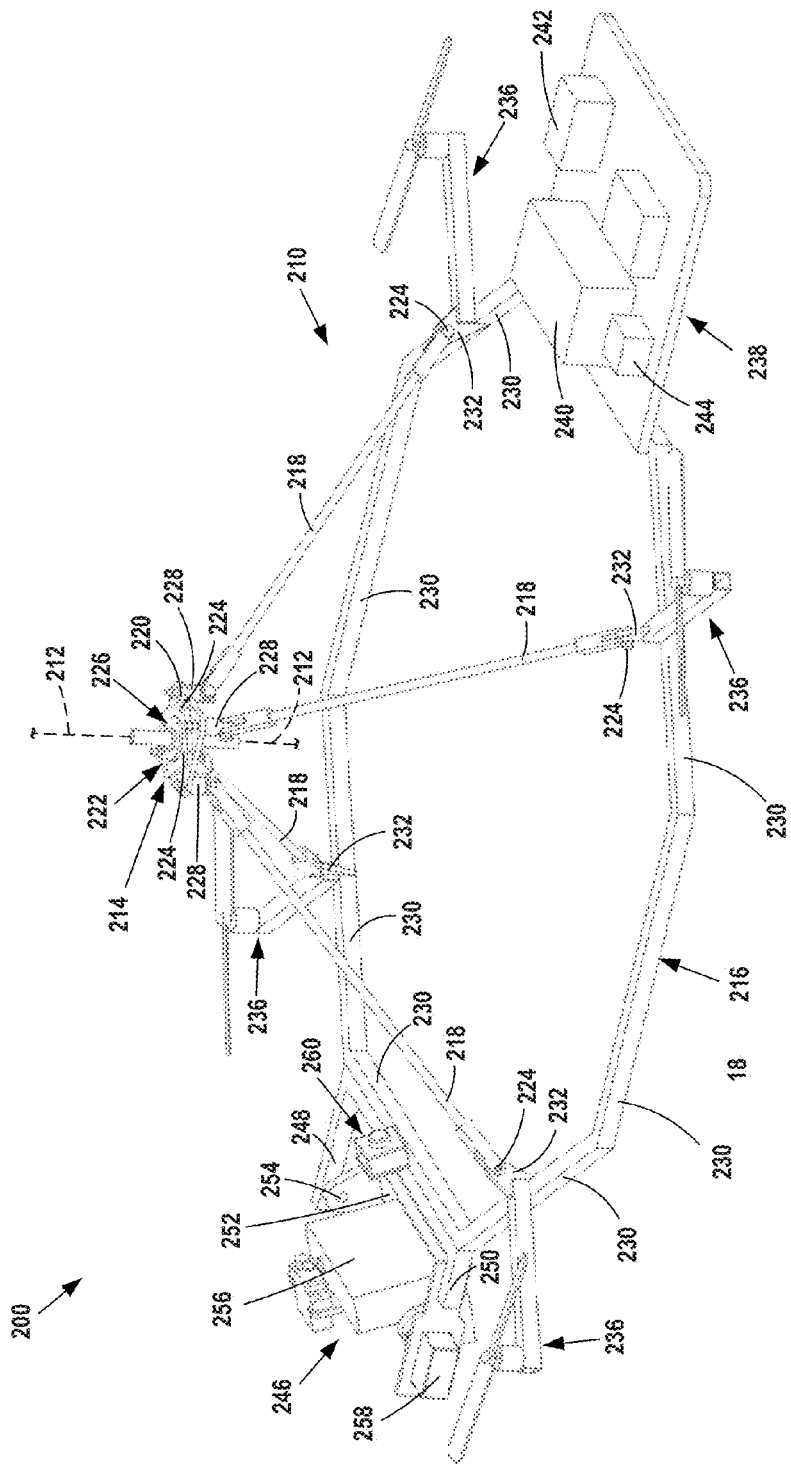
FIG. 17 is a perspective view of a second embodiment aerostat assembly.
Figure 18:
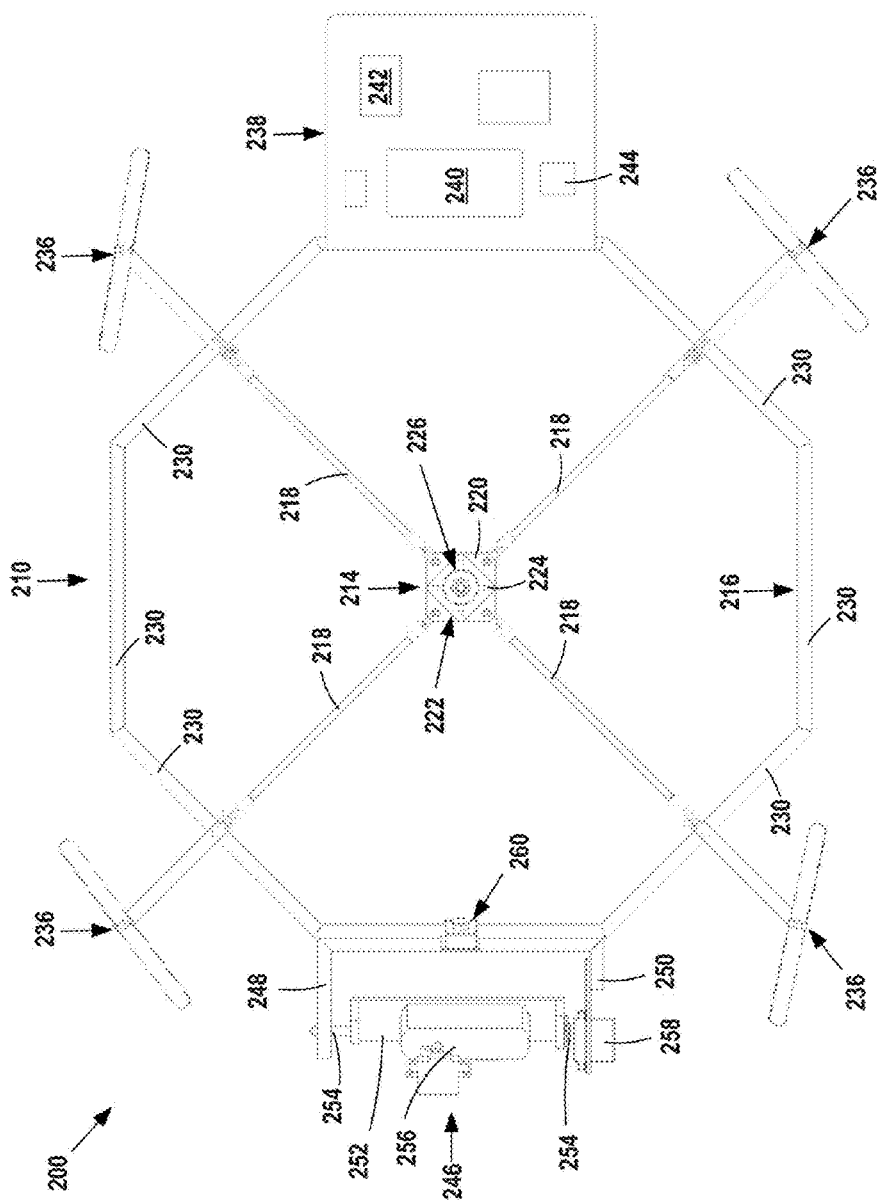
FIG. 18 is a top view of the second embodiment aerostat assembly.
Figure 19:
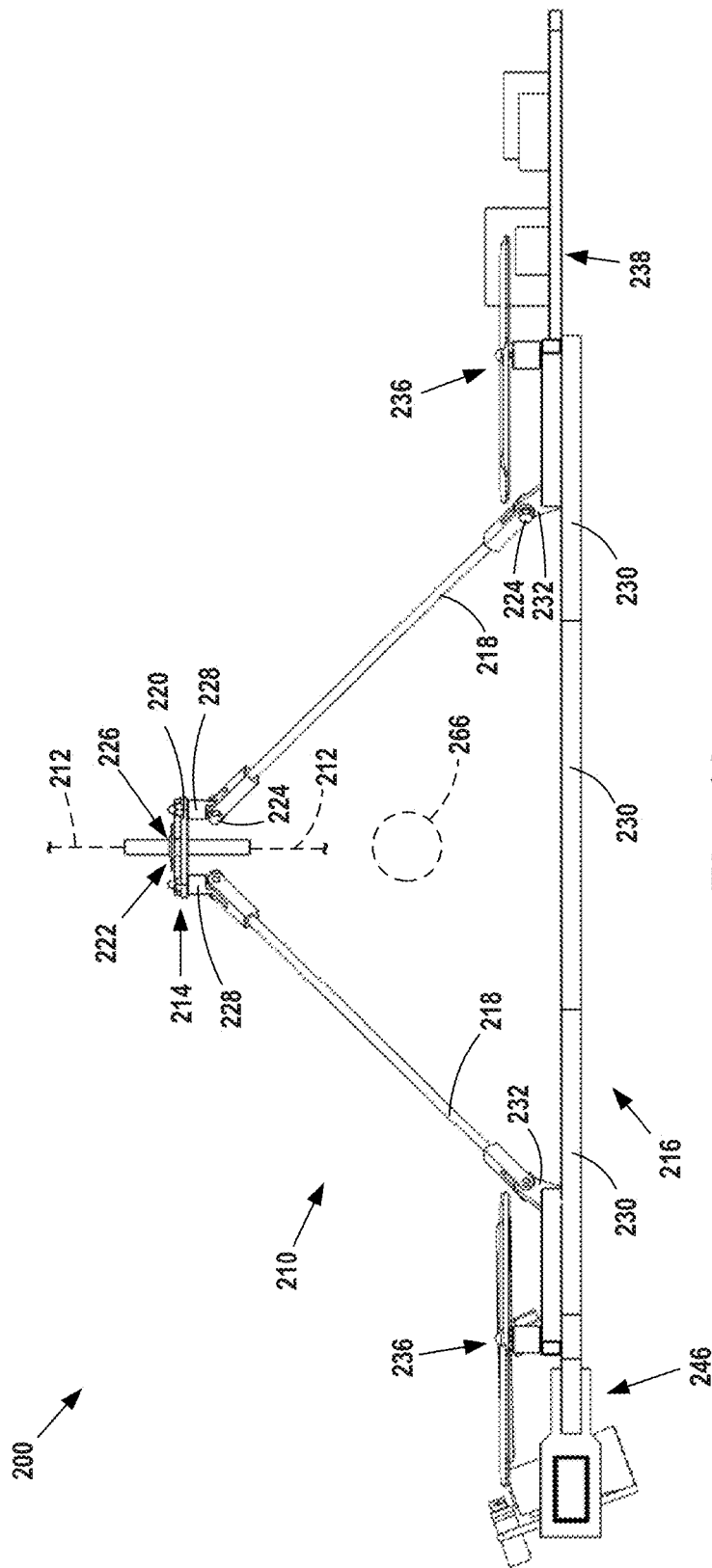
FIG. 19 is a side view of the second embodiment aerostat assembly.

Polygonal frame 216 has one or more fan thruster assemblies 236. Each fan thruster assembly 236 may be similar or identical to fan thruster assembly 86 as described above. Each fan thruster assembly 236 may be rigidly mounted to frame 216 as shown in FIGS. 17-19. Alternatively, a rotational assembly like rotational assembly 90 described above may be used to allow the operator to rotate each fan thruster assembly 236 relative to polygonal frame 216.

Polygonal frame 216 has a plate support 238 for holding a control module 240 and energy source 242 identical to control module 104 and energy source 10 described above. If desired, support 238 may also have one or more tilt sensors 244 identical to sensor 110 described above.

Polygonal frame 216 has a camera support 246 similar to camera support 112 described above. Camera support 246 has a pair of support arms 248 and 250 and a support base 252 pivotally attached to arms 248 and 250 at pivot joints 254. A camera 256 is mounted on support base 252. A rotational assembly 258 located at a pivot joint 254 allows an operator to adjust the position of support base 252 relative to support arms 248 and 250 to allow the operator to adjust camera tilt position. Rotational assembly 258 may include a servomotor.

If desired, camera support 246 may include a pitch sensor like pitch sensor 128.

Polygonal frame 216 may include an inspection camera 260. Inspection camera 260 is aimed toward tether line 212, center support 214 and pivot assembly 222 and allows an operator to monitor proper functioning of the tether line and pivot assembly during aerostat operation. In particular inspection camera 260 may be used to assure that any data and power cabling, if used, will not become excessively twisted about the tether line, which may result from multiple rotations about the tether line. The operator can eliminate twists in the cables before it becomes critical. If desired, inspection camera 260 may be an infra-red sensitive camera having an infra-red source to allow continual operation of the inspection camera 260 in low-light conditions and at night.

Figure 20:
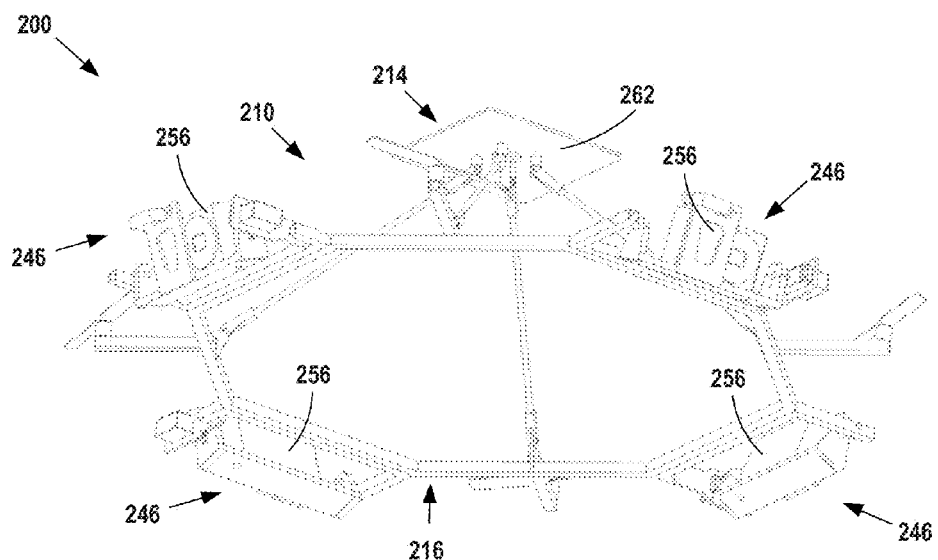
FIG. 20 is a perspective view of the second embodiment aerostat assembly having multiple cameras mounted thereto.

As shown in FIG. 20, polygonal frame 216 may include multiple camera supports 246, each supporting a camera 256. Each camera support is located on a different side of frame 216, allowing the cameras to provide multiple viewing options about frame 216. The use of multiple cameras on the frame allow an operator to increase the assembly's viewing field. Ideally, the multiple cameras give the assembly a viewing field of 360 degrees surrounding the assembly, as illustrated by the four cameras mounted to frame 216 in FIG. 20.

Use of multiple cameras optimizes assembly use surveillance applications. The viewing field of individual cameras can be controlled to zoom in and center on subjects of specific interest or concern.

FIG. 20 illustrates center support 214 having an alternate embodiment support plate 262. Support plate 262 is large enough to mount control module 240, energy source 242, the various tilt sensors that are disclosed as mounted on plate support 238 above. Component mounting on support plate 262 allows simplified assembly balancing about the center support in the multiple camera assembly shown in FIG. 20.

Figure 21:
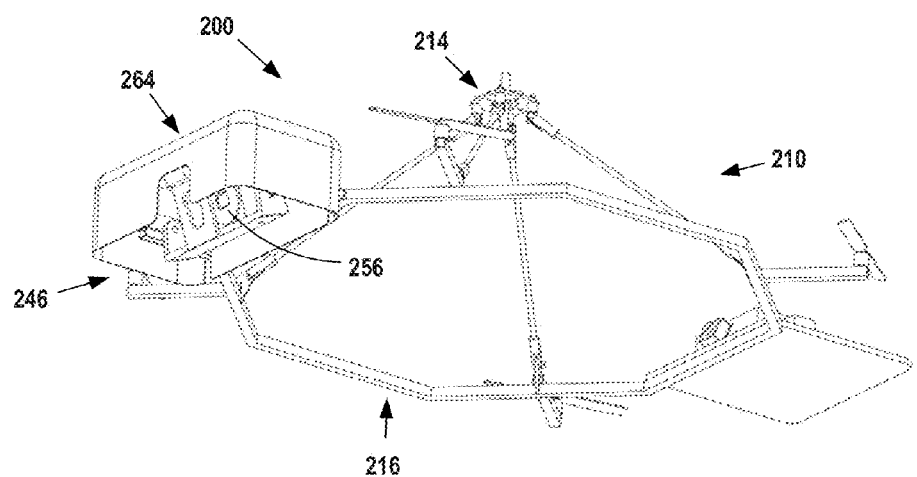
FIG. 21 is a perspective view of the second embodiment aerostat assembly having a rain shield installed on a mounted camera.

As shown in FIG. 21, polygonal frame 216 may include a camera shield housing 264. Shield housing 264 is placed over a camera 256 to protect the camera from precipitation and weather during aerostat use.

Frame assembly 210 is constructed so that the weight of polygonal frame 216 is balanced about center support 214 and pivot assembly 222 so that frame assembly 210 is in mechanical equilibrium and the frame assembly beams 230 remain generally parallel to the ground. Thrust forces or winds change the rotational position of the frame assembly about its pitch and roll axes. The frame assembly returns to a position generally parallel to the ground when the thrust forces or winds cease.

Frame assembly 210 is constructed so that frame assembly center of gravity 266 is located under center support 214 and pivot assembly 222 as illustrated in FIG. 19. As in frame assembly 16, the location of center of gravity 266 under pivot assembly 222 contributes to the stability of frame assembly 210 about pivot assembly 222 so that the frame assembly is encouraged to return to a position generally parallel to the ground when disturbing thrust forces or winds cease.

In the second embodiment assembly 200, the distance between pivot assembly 222 and the center of gravity 266 may be easily adjusted by changing the length of the spars 218, or alternate flexible cords or cables if used, as noted before. This allows the assembly operator to optimize the overall stability characteristics of the aerostat assembly.

In alternate possible embodiments, frame assembly 210 may be a polygonal frame 216 having a shape other than an octagon made up of eight support beams 230, such as a triangular frame made up of three support beams, a square frame made up of four support beams, a pentagonal frame made up of five support beams and so forth.

Figure 23:
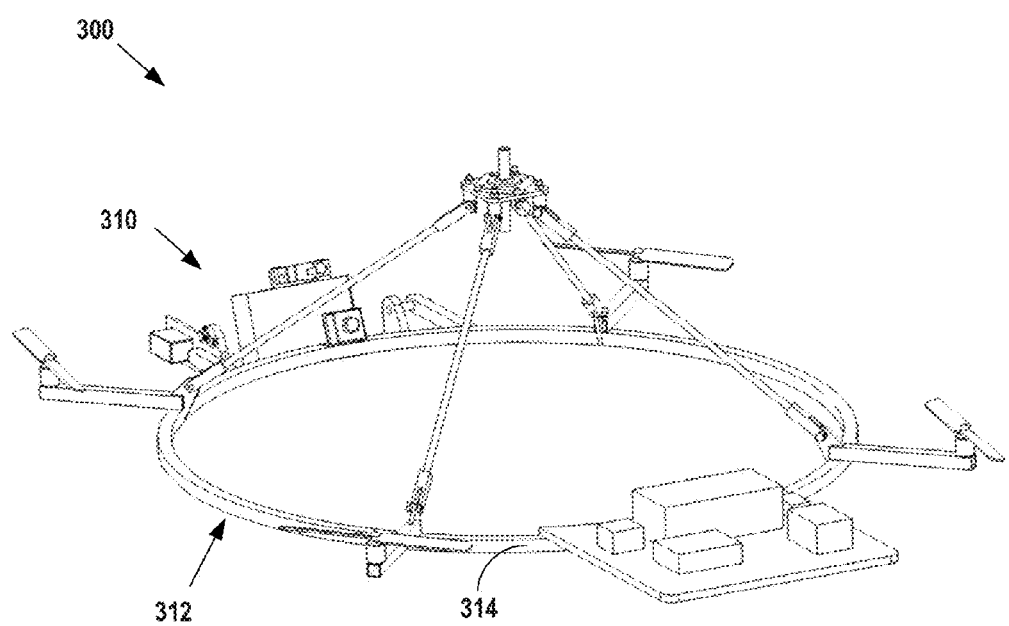
FIG. 23 is a perspective view of an alternate embodiment aerostat assembly.

FIG. 23 illustrates an alternate embodiment aerostat assembly 300 frame assembly 310 having a circular frame 312 made of a single circular beam 314.

In another alternate embodiment, the aerostat assembly may be suspended from a tree, tower or like tall structure. In these free-hanging embodiments, the frame assembly is suspended by a tether line that hangs from a point on the tower and the length of tether line that extends from the frame assembly to the ground is eliminated. The tower may be part of a fixed structure such as a building or be extended from a mobile structure like an extendable tower or crane mounted to a truck or other vehicle.

In a further alternate embodiment, the aerostat assembly may be mounted to the top of a tower or like vertical boom. In these embodiments the frame assembly is mounted to the tower or boom by joining the pivot assembly pivot ball to the tower or boom top by a pin or the like downwardly extending structure. The assembly can then be moved about the pivot assembly through use of the thrusters as described below. The tower or vertical boom may be mounted on trucks or other vehicles for certain mobile applications.

The free-hanging and tower top aerostat assembly embodiments allows stability and operator control of camera position despite winds that exist at elevations above the ground.

Operation of the aerostat assembly will now be described.

The disclosed aerostat assembly may be operated in either a tethered embodiment having a tether line extending to a ground anchor or in an untethered embodiment that allows free-flight of the assembly.

Figure 13:
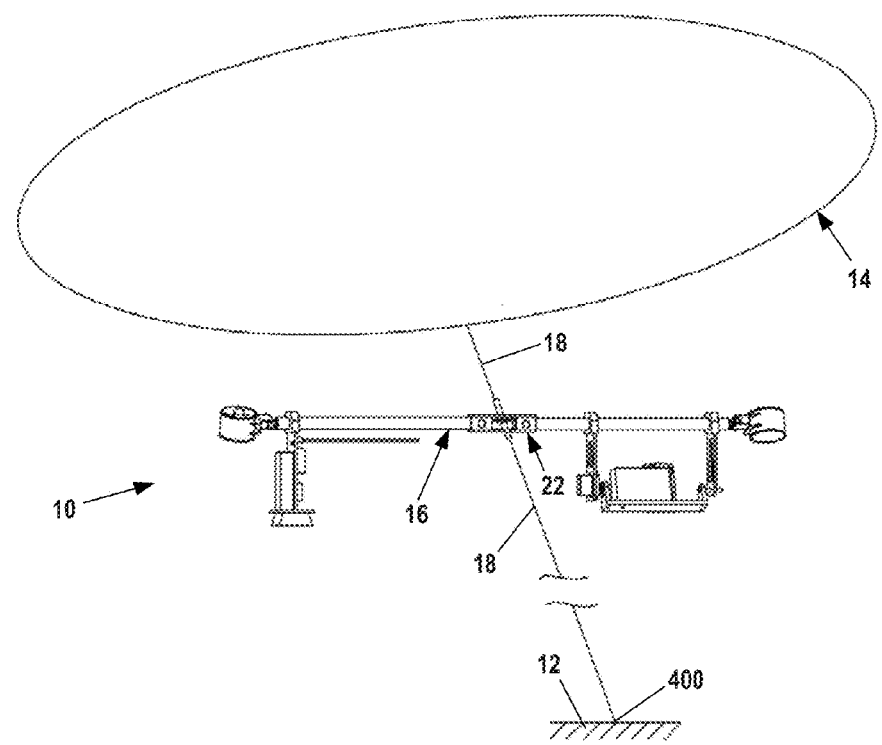
FIGS. 13 and 14 are other perspective views of tethered aerostat assemblies.

The tethered embodiment of first embodiment aerostat assembly 10 is shown in FIGS. 1, 13 and 14. Tether line 18 extends from balloon 14 and through tether line mounting tube 68 at center support 22 to an anchor point 400 on the ground 12.

While the figures of the current application show anchor point 400 at ground 12, it is understood that the assembly could be anchored to other natural or man-made locations and objects such as posts, towers, trees, buildings, vehicles or the like depending on assembly applications. As such, anchor point 400 could be located at corresponding positions other than the ground.

FIGS. 1 and 13 show a tethered aerostat assembly 10 at the end of a taut tether line 18. Tether line 18 is taut when the aerostat assembly has reached a maximum height. The tether line may also become taut when wind exerts force against the aerostat assembly to push the assembly in the direction of the wind until the tether line becomes taut as shown in FIG. 13.

FIG. 14 shows a tethered aerostat assembly 10 at the end of a slack tether line 18. Tether line 18 is slack when the aerostat assembly has not reached a maximum height as allowed by the length of the tether line or wind has not pushed the aerostat assembly to the limit of tether line length. The slack tether line allows some assembly maneuverability within the limits of the tether line.

The tethered embodiments of aerostat assembly 10 are conventionally used for outdoor applications. As stated above, the tethered embodiment of aerostat assembly 10 may include a power or fuel line that extends from the ground and along the tether line to the boom assembly to provide power or fuel to the thruster assemblies.

If desired, the tethered embodiment of aerostat assembly 10 may also include one or more data cables. The data cables extend from the ground and along the tether line to the boom assembly. One cable may be used to transmit operator instructions to the thruster assemblies while another is used to send picture data from the aerostat assembly to the ground operator.

Figure 15:
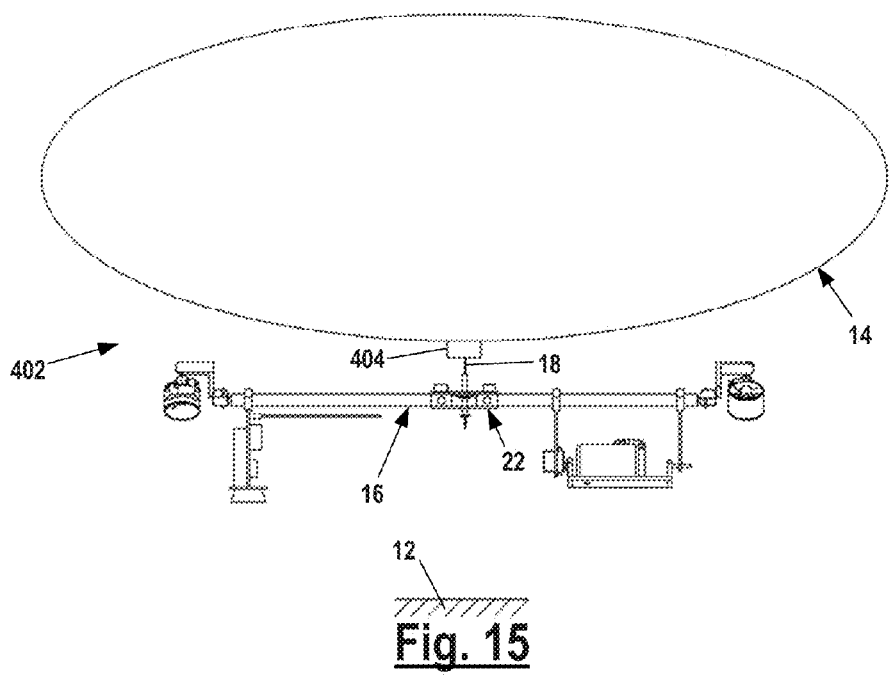
FIG. 15 is a perspective view of an untethered aerostat assembly.

FIG. 15 illustrates an untethered embodiment aerostat assembly 402. Aerostat assembly 402 tether line 18 does not extend to ground 12.

Untethered aerostat assembly 402 allows free-flight of the assembly without restriction from a ground-anchored tether line.

Untethered aerostat assembly 402 may be used for outdoor or indoor applications. When used for indoor applications, the balloon 14 is filled with a quantity of lighter-than-air gas sufficient to provide an upward lift force greater than the weight of the aerostat assembly. This allows the assembly to rest against the ceiling of the indoor space when not in use. If desired, the appearance of the aerostat assembly may be further masked by coloring the aerostat assembly an identical color as the ceiling.

Aerostat assembly 402 may include a spool or winch 404. Spool 404 may be electrically powered and is actuated by signals from control module 104. Spool 404 allows an operator to adjust the length of tether line 18 between the balloon and the boom assembly. This allows the operator to change the vertical position the boom assembly without activating the thruster assemblies and permits additional operator control over the camera position and camera's picture frame.

Figure 16:
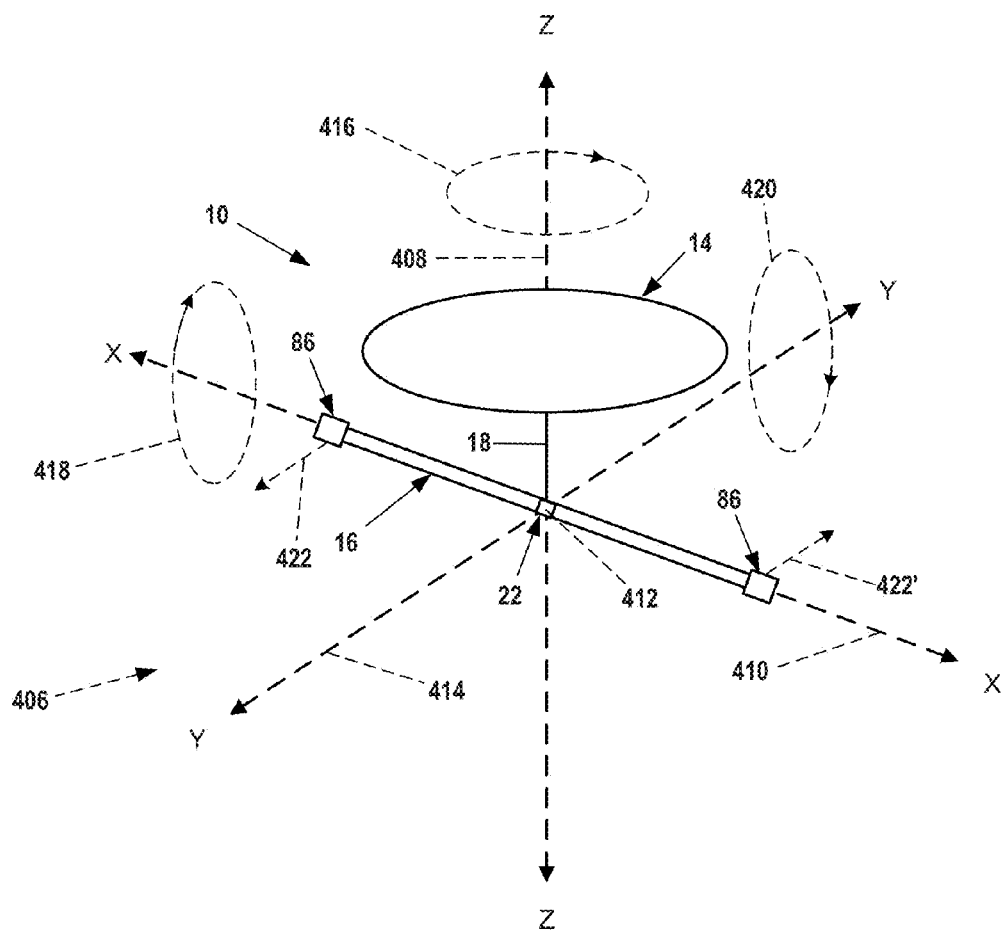
FIG. 16 is a representational view of the first embodiment aerostat assembly superimposed over a coordinate system.

FIG. 16 is a representational view of first embodiment aerostat assembly 10 superimposed over three-dimensional Cartesian system 406.

Taut tether line 18 extends along Z-axis or yaw-axis 408 from balloon 14 to frame assembly 16. Frame assembly 16 extends along X-axis or pitch axis 410 to center support 22. Center support 22 is located at system origin 412. The assembly faces forward in the direction of Y-axis or roll axis 414.

Z-axis or yaw axis 408 is the vertical axis for the assembly. Assembly yaw motion about yaw axis 408 is illustrated by dashed arrow 416.

X-axis or pitch axis 410 is the lateral axis for the assembly. Pitch axis 410 extends along frame assembly 16. Assembly pitch motion about the pitch axis is illustrated by dashed arrow 418.

Y-axis or roll axis 414 is the longitudinal axis for the assembly. Assembly roll motion about the roll axis is illustrated by dashed arrow 420.

In the absence of wind or thrust forces acting on the assembly, the assembly rests in stable static equilibrium about it yaw, pitch and roll axes. When the assembly is in stable static equilibrium, pitch axis 410 and roll axis 414 are generally parallel to the ground.

The assembly operator controls rotational yaw motion 416 and roll motion 420 by manipulating thruster assemblies 86 as described below.

The assembly resists pitch motion 418, and will only undergo pitch motion 418 when affected by strong winds or rapid flight maneuvers. Any support base 118 pitch motions are detected by pitch sensor 128. Pitch sensor 128 will then send signals to camera base rotational servo assembly 126 to compensate for pitch motion 418 to maintain a desired camera picture frame.

During aerostat assembly flight, an operator changes the position of the assembly by activating thruster assemblies 86.

For translational motion from one point in air space to another point in airspace or to hold the aerostat assembly in position against a wind, first both thrusters are pointed in an identical direction. The thrusters are then activated to produce identical amounts of thrust against the wind or in the direction of desired translation.

For embodiments in which the assembly balloon provides an upward lift force less than the weight of the aerostat assembly, the thrusters are used to provide an additional upward lift force for the aerostat assembly to raise the assembly to a desired altitude.

For use in indoor applications in which the assembly balloon provides an upward lift force greater than the weight of the aerostat assembly so that the assembly rests against a ceiling when not in use, the thrusters are used to provide a downward force to lower the assembly away from ceiling to accomplish maneuvers.

For rotational motion about its yaw or roll axes to turn the aerostat assembly, to compensate for wind or to move a boom into position to capture or maintain a picture frame, the thruster assemblies provide thrust proportionally, individually or together to achieve a desired rotational motion. The pivot assembly in center support 22 allows the frame assembly 16 to rotate freely about center support 22, permitting rotational motion about the yaw or roll axis.

Rotational motion 420 about roll axis 414 may be accomplished by increasing the amount of vertical thrust provided by one thruster assembly and reducing the amount of vertical thrust provided by the other. Vertical thrust is provided parallel to Z-axis 408.

Rotational motion 416 about yaw axis 408 is accomplished by providing yaw thrust in the X-Y plane. Yaw thrust is parallel to the roll axis 414 and is illustrated by arrow 422.

When the thruster assemblies are positioned to generate thrust within the X-Y plane, yaw thrust 414 is generated by one thruster assembly alone or by providing thrust from both thruster assemblies, each facing in opposite directions within the X-Y plane to provide thrust 422 and 422' to generate rotational motion 416.

When the thruster assemblies are positioned to generate both yaw thrust and a vertical thrust, the thruster assemblies face in opposite directions and provide thrust 422 and 422' to generate rotational motion 416.

Figure 22:
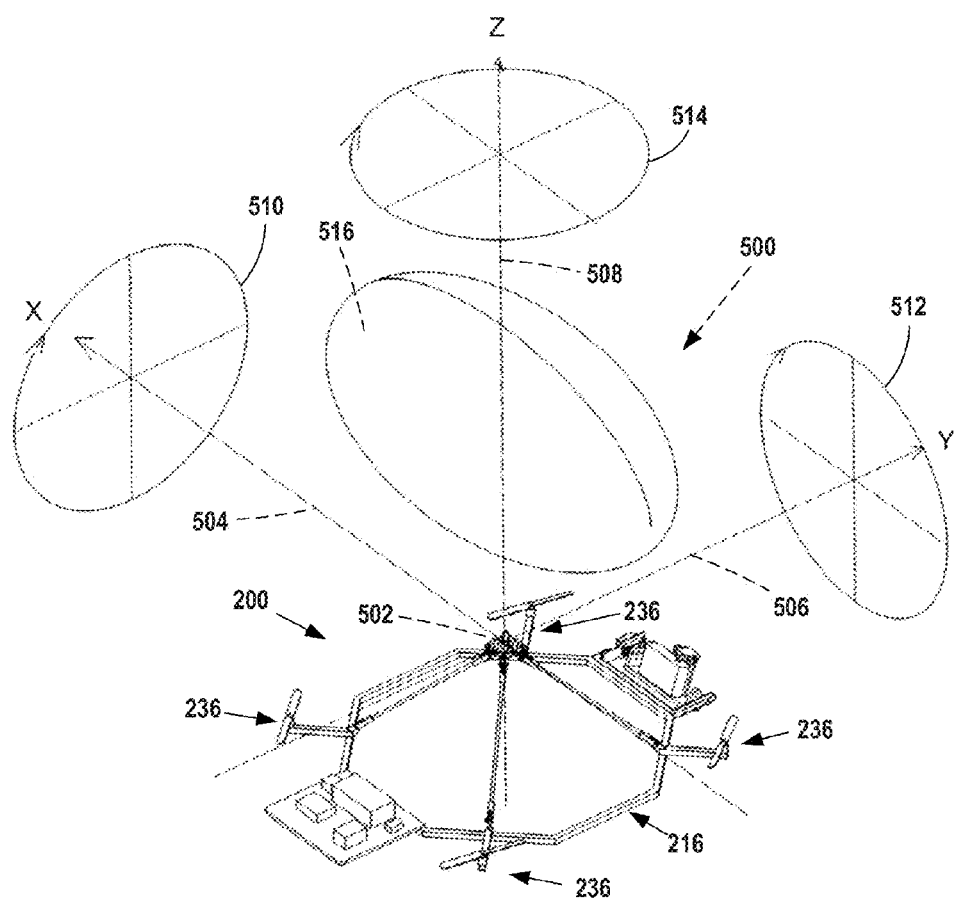
FIG. 22 is a representational view of the second embodiment aerostat assembly superimposed over a coordinate system.

FIG. 22 is a representational view of a second embodiment aerostat assembly 200 superimposed over three-dimensional Cartesian system 500. Three-dimensional Cartesian system 500 is identical to three-dimensional Cartesian system 406 described above having origin 502, X-axis or pitch axis 504, Y-axis or roll axis 506 and Z-axis or yaw axis 508.

Assembly pitch motion about pitch axis 504 is illustrated by arrow 510.

Assembly roll motion about roll axis 506 is illustrated by arrow 512.

Assembly yaw motion about yaw axis 508 is illustrated by arrow 514.

In the absence of wind or thrust forces acting on the assembly, assembly 200 rests in stable static equilibrium about it yaw, pitch and roll axes. When the assembly is in stable static equilibrium, pitch axis 504 and roll axis 506 are generally parallel to the ground.

During aerostat assembly flight, an operator changes the position of the assembly by activating thruster assemblies 236.

If assembly 200 includes one or more thrusters including a rotational assembly, translational motion or rotational motion is accomplished in a manner similar as described for assembly 10 above where one or more thruster assembly are activated to provide thrust proportionally, individually or together to achieve a desired rotational motion about a desired axis.

In certain tethered applications, the supporting aerostat 516 provides translational positioning for assembly 200. In these cases, assembly sensors are used to controlling the thrusters in order to maintain a more precise leveling of pitch and roll than in an untethered situation.

If assembly 200 includes fan thruster assemblies 236 that are rigidly mounted to the assembly frame, translational motion or rotational motion is accomplished by manipulating the speed of individual thruster assemblies as is known in the operation of helicopter-type aircraft, particularly the operation of multiple rotor multicopter-type air craft. By adjusting the speed and rotation direction of specific fan thruster assemblies an operator can achieve a desired translational motion or rotational motion of the frame assembly about a desired axis.

While embodiments of the assembly have been described in detail, it is understood that this is capable of modification and that the assembly is not limited to the precise details set forth but includes such changes and alterations as fall within the purview of the following claims.

The invention claimed is:

1. An aerostat assembly comprising:
   a balloon containing a quantity of buoyant gas, a frame assembly having a center support and one or more beams and one or more thruster assemblies, each thruster assembly having a thruster; a tether line extending from the balloon to the center support; the center support having a pivot assembly engaging the tether line; a controller, the controller actuating each thruster; the assembly having a yaw axis, a pitch axis and a roll axis; wherein said buoyant gas exerts an upward lift force on the aerostat assembly, the frame assembly is in mechanical equilibrium, the pivot assembly allows rotation of the frame assembly about the yaw axis, and a thruster exerts a turning force on the boom assembly about any of the yaw, pitch or roll axes wherein the pivot assembly comprises a gimbal assembly.

2. The aerostat assembly of claim 1 wherein the frame assembly comprises a center of gravity located under the center support.

3. The aerostat assembly of claim 1 wherein the frame assembly comprises a boom assembly.

4. The aerostat assembly of claim 1 wherein the frame assembly comprises a polygonal frame, the frame assembly located under the center support.

5. The aerostat assembly of claim 1 wherein the thruster assembly comprises a rotational assembly.

6. The aerostat assembly of claim 1 wherein the frame assembly comprises one or more cameras.

7. The aerostat assembly of claim 1 wherein the tether line extends from the frame assembly center support to the ground.

8. The aerostat assembly of claim 2 wherein the one or more beams are located under the center support.

9. An aerostat assembly having a yaw axis, a pitch axis and a roll axis, the assembly comprising:
   a frame assembly having a center support located at the approximate center of the frame assembly, the weight of the frame assembly balanced about the center support;
   the support member having a pivot assembly;
   one or more thruster assemblies located on the frame assembly;
   a controller, the controller actuating each thruster assembly wherein the pivot assembly allows rotation of the frame assembly around the yaw axis, and a thruster exerts a turning force on the frame assembly wherein the pivot assembly comprises a gimbal assembly.

10. The aerostat assembly of claim 9 wherein the frame assembly has a center of gravity under the center support.

11. The aerostat assembly of claim 10 wherein the frame assembly comprises one or more beams located adjacent to and generally co-planar with the support member.

12. The aerostat assembly of claim 11 comprising two beams, the frame assembly is generally elongate, and each beam comprises a thruster assembly.

13. The aerostat assembly of claim 10 wherein the frame assembly comprises one or more beams located under the center support.

14. The aerostat assembly of claim 9 wherein each thruster assembly exerts a turning force on the frame assembly about the yaw, roll and pitch axes.

15. The aerostat assembly of claim 13 wherein the frame assembly comprises a circular frame.

16. The aerostat assembly of claim 9 wherein the frame assembly comprises one or more cameras.

17. The aerostat assembly of claim 9 wherein the center support comprises a tether line joining the aerostat assembly to a balloon containing a quantity of buoyant gas.

18. The aerostat assembly of claim 1 wherein the gimbal assembly comprises a pivot ball and a rolling element assembly.

19. The aerostat assembly of claim 9 wherein the gimbal assembly comprises a pivot ball and a rolling element assembly.

\* \* \* \* \*